US012322340B1

(12) United States Patent
Mao et al.

(10) Patent No.: US 12,322,340 B1
(45) Date of Patent: Jun. 3, 2025

(54) PIXEL CIRCUIT, DISPLAY PANEL AND BRIGHTNESS COMPENSATION METHOD THEREOF

(71) Applicant: Glenfly Tech Co., Ltd., Shanghai (CN)

(72) Inventors: Zhifeng Mao, Shanghai (CN); Bin Sheng, Shanghai (CN); Fei Gou, Shanghai (CN); Wenwei Xu, Shanghai (CN); Jing Xie, Shanghai (CN); Wei Liu, Shanghai (CN)

(73) Assignee: GLENFLY TECH CO., LTD., Shanghai (CN)

( * ) Notice: Subject to any disclaimer, the term of this patent is extended or adjusted under 35 U.S.C. 154(b) by 0 days.

(21) Appl. No.: 18/606,650

(22) Filed: Mar. 15, 2024

(30) Foreign Application Priority Data

Nov. 29, 2023 (CN) ........................ 202311620793.2

(51) Int. Cl.
*G09G 3/3233* (2016.01)

(52) U.S. Cl.
CPC ... *G09G 3/3233* (2013.01); *G09G 2300/0842* (2013.01); *G09G 2320/0233* (2013.01)

(58) Field of Classification Search
CPC ......... G09G 3/3233; G09G 2300/0842; G09G 2320/0233
See application file for complete search history.

(56) References Cited

U.S. PATENT DOCUMENTS

| | | | | |
|---|---|---|---|---|
| 2010/0220118 A1* | 9/2010 | Kanegae | .............. | G09G 3/3233 345/690 |
| 2021/0335229 A1* | 10/2021 | Liu | ...................... | G09G 3/3208 |
| 2023/0206834 A1* | 6/2023 | Liu | ...................... | G09G 3/3233 345/212 |
| 2023/0306910 A1* | 9/2023 | Yamamoto | ........... | G09G 3/3233 |
| 2024/0087519 A1* | 3/2024 | Kim | ..................... | G09G 3/3233 |

* cited by examiner

*Primary Examiner* — Temesghen Ghebretinsae
*Assistant Examiner* — Ivelisse Martinez Quiles
(74) *Attorney, Agent, or Firm* — NIXON PEABODY LLP

(57) ABSTRACT

A pixel circuit includes a drive transistor, a data writing module, a storage module, and a light emitting control module; a first terminal of the storage module is configured to receive a first power supply voltage signal, and a second terminal of the storage module is configured to be connected to a control electrode of the drive transistor; a first terminal of the data writing module is configured to receive a data signal, and a second terminal of the data writing module is configured to be connected to the control electrode of the drive transistor; a substrate of the drive transistor is configured to receive a second voltage signal, a first electrode of the drive transistor is configured to receive the first power supply voltage signal, and a second electrode of the drive transistor is configured to be connected to at least partial light emitting control module.

17 Claims, 7 Drawing Sheets

PIXEL CIRCUIT, DISPLAY PANEL AND BRIGHTNESS COMPENSATION METHOD THEREOF

CROSS REFERENCES TO RELATED APPLICATION

The present application claims priority to Chinese patent application No. 202311620793.2, titled "Pixel Circuit, Display Panel and Brightness Compensation Method Thereof", and filed on Nov. 29, 2023, the content of which is hereby incorporated by reference in its entirety.

TECHNICAL FIELD

The present disclosure relates to the field of display technology, and particularly to a pixel circuit, a display panel, and a brightness compensation method for a display panel.

BACKGROUND

The Organic Light Emitting Diode (OLED) display panels are widely used in electronic products. The OLED display panel has excellent characteristics such as no backlight, high contrast, a thin thickness, a wide angle of view, a fast reaction speed, a wide range of use temperatures, and can be used in flexible panels, etc.

Generally, the OLED display panel includes a plurality of light-emitting pixel units arranged in an array. Each light-emitting pixel unit includes an OLED light-emitting element and a pixel circuit configured to drive the OLED light-emitting element to emit light. The pixel circuit generally includes a drive transistor. The drive transistor provides drive current to the OLED light-emitting element to drive the OLED light-emitting element to emit light, thus achieving display of images on the OLED display panel. However, in the pixel circuit, a threshold voltage of the drive transistor may directly affect the drive current, and indexes such as the magnitude, accuracy, and stability of the drive current may directly affect the emission of the light-emitting element, for example, the brightness of the light-emitting element.

SUMMARY

In view of this, as for the technical problem described above, it is necessary to provide a pixel circuit, a display panel, and a brightness compensation method for a display panel capable of allowing the brightness of the OLED light-emitting element in the display panel to be consistent with the target brightness.

According to the first aspect of the present disclosure, a pixel circuit is provided, including a driver thin film transistor (TFT), a data writing module, a storage module, and a light emitting control module; a first terminal of the storage module is configured to receive a first power supply voltage signal, and a second terminal of the storage module is configured to be connected to a control electrode of the drive transistor; a first terminal of the data writing module is configured to receive a data signal, a second terminal of the data writing module is configured to be connected to the control electrode of the drive transistor, and the data writing module is configured to write the data signal into the storage module in a data writing phase; the control electrode of the drive transistor is further configured to receive a first voltage signal, a substrate of the drive transistor is configured to receive a second voltage signal, a first electrode of the drive transistor is configured to receive a first power supply voltage signal, a second electrode of the drive transistor is configured to be connected to at least partial light emitting control module, and the first voltage signal is different from the second voltage signal; a control terminal of the light emitting control module is configured to receive a light emitting control signal, and an output terminal of the light emitting control module is configured to be connected to a light-emitting element; a threshold voltage of the drive transistor is regulated under a combined effect of the first voltage signal and the second voltage signal in a threshold compensation phase, and a time sequence of the threshold compensation phase is different from a time sequence of the data writing phase.

In an embodiment, when a potential of the first voltage signal is greater than a potential of the second voltage signal, an absolute value of the threshold voltage of the drive transistor is reduced to be less than a reference threshold voltage under a combined effect of the first voltage signal and the second voltage signal in the threshold compensation phase.

In an embodiment, when a potential of the first voltage signal is less than a potential of the second voltage signal, an absolute value of the threshold voltage of the drive transistor is increased to be greater than a reference threshold voltage under a combined effect of the first voltage signal and the second voltage signal in the threshold compensation phase.

In an embodiment, a signal transmission line configured to provide a data signal in the pixel circuit is multiplexed to provide the first voltage signal.

In an embodiment, the light emitting control module is connected between the second electrode of the drive transistor and the light-emitting element, the control terminal of the light emitting control module is configured to receive the light emitting control signal, the first electrode and the substrate of the drive transistor are both configured to receive the first power supply voltage signal, the threshold voltage of the drive transistor is changed under the combined effect of the first voltage signal and the first supply voltage signal in the threshold compensation phase.

In an embodiment, the light emitting control module includes a light emitting control transistor, a first electrode of the light emitting control transistor is configured to be connected to the second electrode of the drive transistor, a second electrode of the light emitting control transistor is configured to be connected to the light-emitting element, and a control electrode of the light emitting control transistor is configured to receive the light emitting control signal.

In an embodiment, the light emitting control module includes a first light emitting control unit and a second light emitting control unit, a first terminal of the first light emitting control unit is configured to be connected to the second electrode of the drive transistor, a second terminal of the first light emitting control unit is configured to be connected to the light-emitting element, a first terminal of the second light emitting control unit is configured to receive the first power supply voltage signal, a second terminal of the second light emitting control unit is configured to be connected to the first electrode of the drive transistor, and a control terminal of the first light emitting control unit and a control terminal of the second light emitting control unit are respectively configured to receive the light emitting control signal.

In an embodiment, the first light emitting control unit includes a first light emitting control transistor, a first electrode of the first light emitting control transistor is configured to be connected to the second electrode of the drive transistor, a second electrode of the first light emitting control transistor is configured to be connected to the light-emitting element, the second light emitting control unit includes a second light emitting control transistor, a first electrode of the second light emitting control transistor is configured to receive the first power supply voltage signal, a second electrode of the second light emitting control transistor is configured to be connected to the first electrode of the drive transistor, a control electrode of the first light emitting control transistor and a control electrode of the second light emitting control transistor are respectively configured to receive the light emitting control signal.

In an embodiment, the drive transistor is a floating gate transistor.

In an embodiment, the second voltage signal is the first power supply voltage signal.

According to the second aspect of the present disclosure, a display panel is provided, including at least one the above-mentioned pixel circuit, and a display driver circuit connected to the pixel circuit and configured to acquire brightness information of the light-emitting element connected to the pixel circuit, and provide the first voltage signal and the second voltage signal to the pixel circuit in the threshold compensation phase according to the brightness information, to change the threshold voltage of the drive transistor in the pixel circuit and allow the brightness information to be consistent with target brightness.

In an embodiment, the display panel further includes a data signal line, a first signal transmission line, and a second signal transmission line, and the display driver circuit is configured to be connected to the data signal line, the first signal transmission line, and the second signal transmission line respectively, and is configured to: provide a data signal in the data writing phase to transmit the data signal to the data writing module through the data signal line; and provide the first voltage signal and the second voltage signal in the threshold compensation phase, the first voltage signal being transmitted to the control electrode of the drive transistor through the first signal transmission line, and the second voltage signal being transmitted to the substrate of the drive transistor through the second signal transmission line.

In an embodiment, the data signal line and the first signal transmission line are the same signal transmission line.

In an embodiment, the display panel further includes a power supply signal line, the display driver circuit further includes a display driver unit and a power supply unit, the display driver unit is configured to provide the data signal in the data writing phase and provide the first voltage signal in the threshold compensation phase, the power supply unit is connected to the display driver unit and is configured to provide and transmit the first power supply voltage signal to the pixel circuit through the power supply signal line, and provide the second voltage signal in the threshold compensation phase.

In an embodiment, a first terminal of the light emitting control module is configured to be connected to the second electrode of the drive transistor, a second terminal of the light emitting control module is configured to be connected to the light-emitting element, a control terminal of the light emitting control module is configured to receive the light emitting control signal, and the power supply signal line is connected to the second signal transmission line.

According to the third aspect of the present disclosure, a brightness compensation method for the display panel is provided, the method includes: in the threshold compensation phase of the pixel circuit, acquiring brightness information of the light-emitting element connected to the pixel circuit, and providing the first voltage signal and the second voltage signal to the pixel circuit according to the brightness information, to change the threshold voltage of the drive transistor in the pixel circuit and allow the brightness information to be consistent with the target brightness.

In an embodiment, the providing the first voltage signal and the second voltage signal to the pixel circuit according to the brightness information to change the threshold voltage of the drive transistor in the pixel circuit includes: comparing the brightness information to the target brightness, when a comparison result indicates that the brightness information is greater than the target brightness, providing the first voltage signal with a first potential and the second voltage signal with a second potential, to increase an absolute value of the threshold voltage of the drive transistor in the pixel circuit, in which the first potential is less than the second potential; when the comparison result indicates that the brightness information is less than the target brightness, providing the first voltage signal with the first potential and the second voltage signal with the second potential to reduce the absolute value of the threshold voltage of the drive transistor in the pixel circuit, in which the first potential is greater than the second potential.

According to the aforementioned pixel circuit, display panel, and brightness compensation method for the display panel, the pixel circuit includes the drive transistor, the data writing module, the storage module, and the light emitting control module. The first terminal of the storage module is configured to receive the first power supply voltage signal, and the second terminal of the storage module is configured to be connected to the control electrode of the drive transistor. The first terminal of the data writing module is configured to receive the data signal, and the second terminal of the data writing module is configured to be connected to the control electrode of the drive transistor. The data writing module is configured to write the data signal into the storage module in the data writing phase (the data writing phase may be performed in a use process of the pixel circuit after the pixel circuit is delivered from the factory).

In view of this, the control electrode of the drive transistor is further configured to receive the first voltage signal, the substrate of the drive transistor is configured to receive the second voltage signal, the first electrode of the drive transistor is configured to receive the first power supply voltage signal, the second electrode of the drive transistor is connected to at least partial light emitting control module, the control terminal of the light emitting control module is configured to receive the light emitting control signal, and the output terminal of the light emitting control module is configured to be connected to the light-emitting element, the first voltage signal is different from the second voltage signal, accordingly, the threshold voltage of the drive transistor can be regulated under the combined effect of the first voltage signal and the second voltage signal in the threshold compensation phase (which may be completed in a production process of the pixel circuit before the pixel circuit is delivered from the factory), so that the threshold voltage of the drive transistor in each pixel circuit in the display panel is consistent, to allow the brightness of each light-emitting element in the display panel to be consistent with the target brightness, i.e., the brightness of each light-emitting element in the display panel is consistent. By the embodiments of the present disclosure, the brightness uniformity of each light-emitting element in the display panel is improved, so that the display brightness of the screen of the display panel is even, and a good display effect is achieved.

DETAILED DESCRIPTION

In order to make the purpose, the technical solution and advantages of the present disclosure clearer, the present disclosure will be described in further detail with reference to the accompanying drawings and embodiments. It should be appreciated that the specific embodiments described herein are merely intended to explain the present disclosure, rather than limiting the present disclosure.

The pixel circuit provided in the embodiment of the present disclosure can be applied to an OLED display panel to drive an OLED light-emitting element. A driving time sequence of the pixel circuit may include, but is not limited to, a data writing phase and a light emitting phase. The pixel circuit further includes a threshold compensation phase in which a threshold voltage of a drive transistor in the pixel circuit is compensated and regulated. A time sequence of the threshold compensation phase is different from that of the data writing phase, that is, the threshold compensation phase and the data writing phase are located in different time sequences. The threshold compensation phase may be completed in a production process before the pixel circuit is delivered from factory, and the data writing phase may be in a use process after the pixel circuit is delivered from factory.

Figure 1:
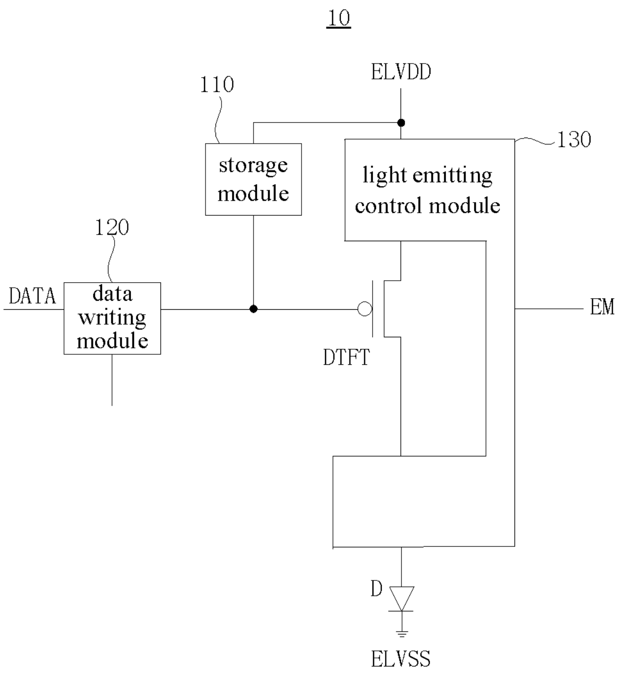
FIG. 1 is a schematic structure diagram of a pixel circuit according to an embodiment.
Figure 2:
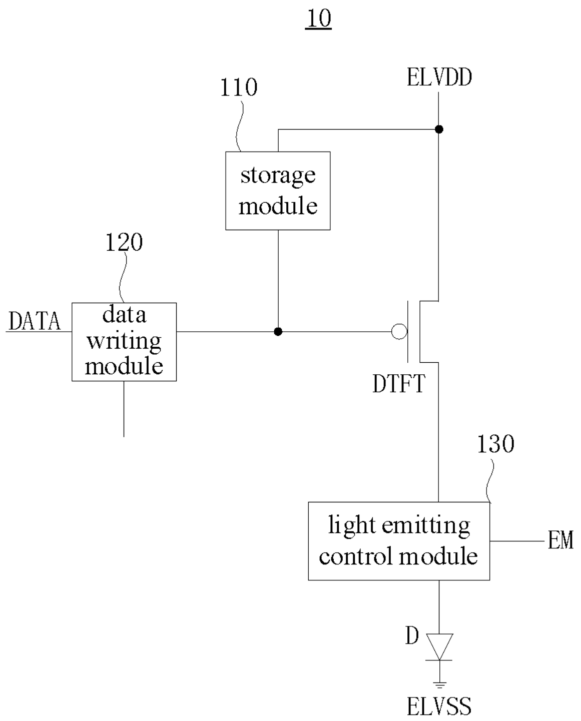
FIG. 2 is a schematic structure diagram of a pixel circuit according to an embodiment.

In an embodiment, with reference to FIG. 1 and FIG. 2, a pixel circuit is provided, which may include a driver thin film transistor (TFT), a data writing module 120, a storage module 110, and a light emitting control module 130. A first terminal of the storage module 110 is configured to receive a first power supply voltage signal ELVDD, and a second terminal of the storage module 110 is connected to a control electrode of the drive transistor. The storage module 110 may include a component having a charge storage function, such as a storage capacitor Cst. The storage module 110 can store a voltage that is written to the control electrode of the drive transistor.

A first terminal of the data writing module 120 is configured to receive a data signal DATA, and a second terminal of the data writing module 120 is connected to the control electrode of the drive transistor. The data writing module 120 is configured to write the data signal DATA into the storage module 110 in the data writing phase. Accordingly, the drive transistor may generate drive current according to the data signal DATA written by the data writing module 120 into the storage module 110 in the data writing phase, to drive the light-emitting element to emit light and implement the screen display of the display panel. The data writing module 120 may include a data writing transistor T2.

A control terminal of the light emitting control module 130 is configured to receive a light emitting control signal EM, and an output terminal of the light emitting control module 130 is configured to be connected to the light-emitting element. The light emitting control module 130 can control the light-emitting element to emit light according to the light emitting control signal EM.

Figure 3:
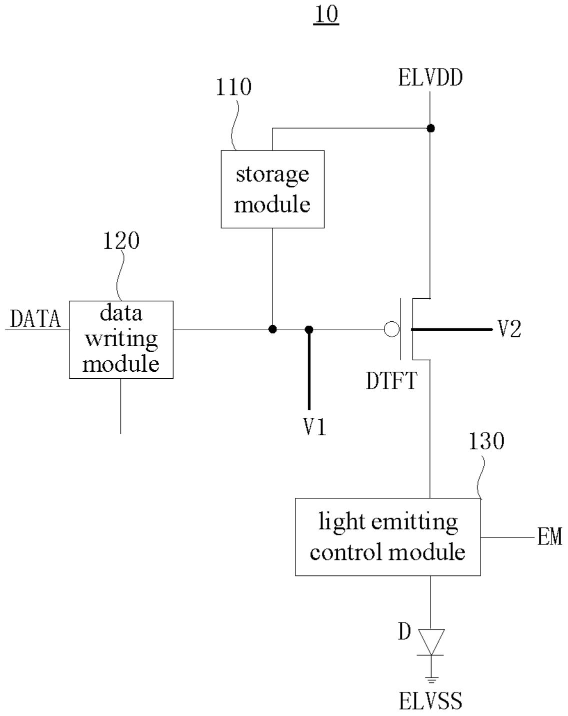
FIG. 3 is a schematic structure diagram of a pixel circuit according to an embodiment.

As shown in FIG. 3, the control electrode of the drive transistor is further configured to receive a first voltage signal V1. A substrate of the drive transistor is configured to receive a second voltage signal V2. A first electrode of the drive transistor is configured to receive a first power supply voltage signal ELVDD, and a second electrode of the drive transistor is connected to at least partial light emitting control module 130. The first voltage signal V1 is different from the second voltage signal V2. Accordingly, in the threshold compensation phase, the threshold voltage of the drive transistor can be regulated under a combined effect of the first voltage signal V1 and the second voltage signal V2, to compensate the threshold voltage of the drive transistor, so that the threshold voltage of the drive transistor reaches a target threshold voltage as required. The threshold compensation phase may be completed in a production process before the pixel circuit is delivered from the factory.

For example, the threshold voltage of the drive transistor may be regulated through the combined effect of the first voltage signal V1 received by the control electrode of the drive transistor and the second voltage signal V2 received by the substrate and based on multiple principles and mechanisms such as quantum tunneling, quantum well, or Fowler-Nordheim (F-N) tunneling, to implement the compensation for the threshold voltage of the drive transistor, so that the threshold voltage of the drive transistor reaches the target threshold voltage as required. In the embodiments of the present disclosure, there is no specific limitations on the principle and mechanism on which the compensation threshold voltage is based. In the embodiments, the drive transistor is a transistor with an adjustable threshold voltage, such as a floating gate transistor. The type and characteristics of the driver FTF are not specifically limited herein. For example, the transistor type of the drive transistor may be either a P-type or an N-type, which is not specifically limited herein.

In the pixel circuit provided by the embodiment of the present disclosure, the first electrode of the drive transistor is configured to receive the first power supply voltage signal ELVDD, and the control electrode of the drive transistor is configured to receive the data signal DATA in the data writing phase. Accordingly, in a use process of the pixel circuit after delivery, the drive transistor DTFT can generate the drive current based on the first power supply voltage signal ELVDD and the data signal DATA written in the data writing phase.

However, in the pixel circuit, the threshold voltage of the drive transistor may directly affect the drive current, and indexes such as the magnitude, accuracy, and stability of the drive current may directly affect the emission of the light-emitting element, for example, the brightness of the light-emitting element.

In view of this, in the pixel circuit of the embodiment of the present disclosure, in the production process of the pixel circuit before the pixel circuit is delivered from the factory, e.g., in the threshold compensation phase, the first electrode of the drive transistor is configured to receive the first voltage signal ELVDD, and the control electrode of the drive transistor is configured to receive the first voltage signal V1. The substrate of the drive transistor is configured to receive the second voltage signal V2, and the second electrode of the drive transistor is connected to at least partial light emitting control module 130. Accordingly, the threshold voltage of the drive transistor can be regulated under the combined effect of the first voltage signal V1 and the second voltage signal V2. The threshold voltage of the drive transistor is changed, and the compensation for the threshold voltage of the drive transistor is implemented, so that the threshold voltage of the drive transistor reaches the target threshold voltage as required. Accordingly, in the use process of the pixel circuit after the pixel circuit is delivered from the factory, the drive current generated by the drive transistor based on the first power supply voltage signal ELVDD and the data signal DATA written in the data writing phase is a current corresponding to a target brightness of the light-emitting element, thereby ensuring the consistency of the brightness and the target brightness of the light-emitting element.

In the embodiment of the present disclosure, in the threshold compensation phase, the threshold voltage of the drive transistor in the pixel circuit is regulated according to the first voltage signal V1 and the second voltage signal V2, and the consistency of the brightness and the target brightness of the light-emitting element can be guaranteed, without additionally providing a dedicated compensation module in the pixel circuit to compensate the brightness of the light-emitting element, such as the pixel circuit 7T1C in the related art. Accordingly, the pixel circuit in the embodiment of the present disclosure has a simple structure and a lower cost. In addition, a display panel with the pixel circuit of the embodiment of the present disclosure has no need to be additionally provided with a dedicated compensation algorithm and a dedicated compensation circuit in order to implement the compensation for the display brightness as in the related art. Therefore, the display panel with the pixel circuit in the embodiment of the present disclosure has a simple structure and a lower cost.

In the following embodiments of the present disclosure, for ease of illustration only, an example which is based on the F-N tunneling principle and in which the drive transistor is a P-type transistor, and the threshold voltage of the drive transistor is regulated under the combined effect of the first voltage signal V1 and the second voltage signal V2 is taken.

In a case where a potential of the first voltage signal V1 is less than a potential of the second voltage signal V2, that is, a potential written into the control electrode of the drive transistor is less than a potential written into the substrate of the drive transistor, hole carriers are trapped in a gate oxide layer of the drive transistor under the combined effect of the first voltage signal V1 and the second voltage signal V2 due to the F-N tunneling effect in the threshold compensation phase, so that an absolute value of the threshold voltage of the drive transistor is increased to be greater than a reference voltage.

In a case where the potential of the first voltage signal V1 is greater than the potential of the second voltage signal V2, that is, the potential written into the control electrode of the drive transistor is greater than the potential written into the substrate of the drive transistor, the hole carriers trapped in the gate oxide layer of the drive transistor are removed due to the F-N tunneling effect in the threshold compensation phase, so that the absolute value of the threshold voltage of the drive transistor is regulated to be less than the reference voltage.

In an embodiment of the present disclosure, the drive transistor in the pixel circuit is a floating gate transistor. By using the floating gate transistor as the drive transistor, the first voltage signal V1 and the second voltage signal V2 may be respectively applied to the control electrode and the substrate of the floating gate transistor, to regulate the threshold voltage of the floating gate transistor under the combined effect of the first voltage signal V1 and the second voltage signal V2. Accordingly, the threshold voltage of the drive transistor in the pixel circuit can be regulated to keep the brightness of the light-emitting element consistent with the target brightness of the light-emitting element.

Figure 4:
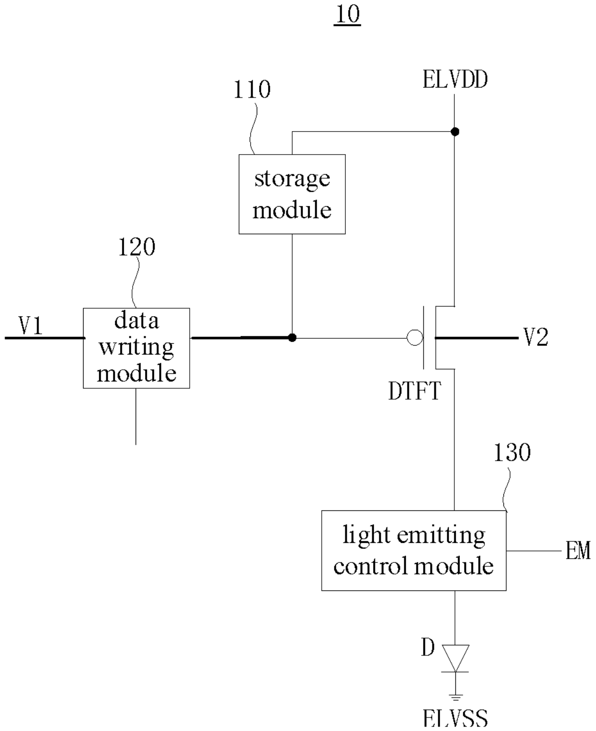
FIG. 4 is a schematic structure diagram of a pixel circuit according to an embodiment.

In an embodiment as shown in FIG. 4, the first voltage signal V1 may be the data signal DATA, that is, a signal transmission line in the pixel circuit configured to provide the data signal DATA is multiplexed to be a signal transmission line that provides the first voltage signal V1. That is, the first voltage signal V1 may be provided by the data writing module 120 to the control electrode of the drive transistor. In the embodiment of the present disclosure, in the data writing phase, the data writing module 120 may write the data signal DATA to the control electrode of the drive transistor. In the threshold compensation phase, the data writing module 120 may further provide the first voltage signal V1 to the control electrode of the drive transistor. In such a manner, there is no need to additionally provide a module or a signal transmission line dedicated to providing the first voltage signal V1, so that the structure of the pixel circuit can be simplified, and the cost of the pixel circuit can be reduced, thereby simplifying the structure of the display panel and reducing the cost of the display panel.

In some other embodiments of the present disclosure, other modules or signal transmission lines may be utilized to provide the first voltage signal V1 to the control electrode of the drive transistor in the threshold compensation phase.

In an embodiment, the light-emitting control module 130 is connected between a second electrode of the drive transistor and the light-emitting element. A control terminal of the light emitting control module 130 is configured to receive a light emitting control signal EM. The first electrode and the substrate of the drive transistor are both configured to receive the first power supply voltage signal ELVDD. In the threshold compensation phase, the threshold voltage of the drive transistor is changed under the combined effect of the first voltage signal V1 and the first supply voltage signal ELVDD.

Figure 5:
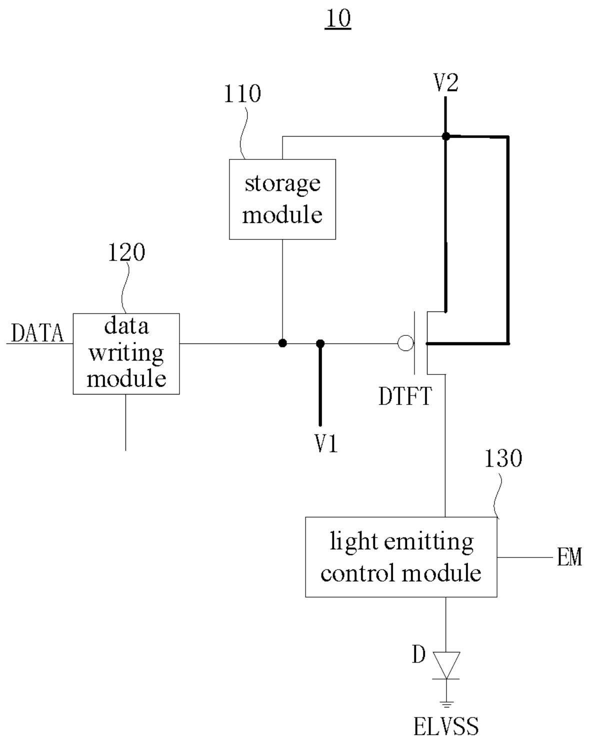
FIG. 5 is a schematic structure diagram of a pixel circuit according to an embodiment.

In an embodiment as shown in FIG. 5, the second voltage signal V2 may be the first power supply voltage signal ELVDD, that is, the second voltage signal V2 may be provided to the substrate of the drive transistor by the module or the signal transmission line providing the first power supply voltage signal ELVDD. In the embodiment of the present disclosure, in an emitting phase, the module or signal transmission line providing the first power supply voltage signal ELVDD may provide the first power supply voltage signal ELVDD to the first electrode of the drive transistor. In the threshold compensation phase, the module or signal transmission line providing the first power supply voltage signal ELVDD may provide the second voltage signal V2 to the substrate of the driver DTFT. In such a manner, there is no need to additionally provide a module or a signal transmission line dedicated to providing the second voltage signal V2, so that the structure of the pixel circuit can be simplified, and the cost of the pixel circuit can be reduced, thereby simplifying the structure of the display panel and reducing the cost of the display panel.

In some other embodiments of the present disclosure, other modules or signal transmission lines may be utilized to provide the second voltage signal V2 to the substrate of the drive transistor in the threshold compensation phase.

Figure 6:
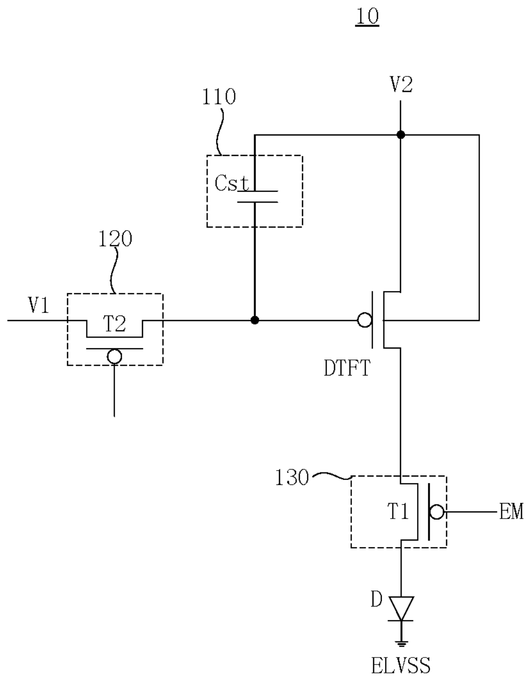
FIG. 6 is a schematic structure diagram of a pixel circuit according to an embodiment.

In an embodiment as shown in FIG. 6, the light emitting control module 130 may include a light emitting control transistor T1. A first electrode of the light emitting control transistor T1 is connected to the second electrode of the drive transistor. A second electrode of the light emitting control transistor T1 is configured to be connected to the light-emitting element, and a control electrode of the light emitting control transistor T1 is configured to receive the light emitting control signal EM.

The pixel circuit shown in FIG. 6 illustrates a 3T1C pixel circuit according to an embodiment of the present disclosure. Referring to FIG. 6, the regulating process of the threshold voltage of the drive transistor in the pixel circuit in the embodiment is illustrated by taking the case based on the F-N tunneling principle and where the drive transistor is a P-type transistor as an example. The control electrode of the drive transistor is the gate of the drive transistor, the first electrode of the drive transistor is the source of the drive transistor, and the second electrode of the drive transistor is the drain of the drive transistor.

In the threshold compensation phase, the first voltage signal V1 is provided to the gate of the drive transistor, and the second voltage signal V2 is provided to the source and the substrate of the drive transistor. The potential of the first voltage signal V1 is less than the potential of the second voltage signal V2. The potential of the gate of the drive transistor is thus less than the potential of the substrate of the drive transistor, and the light emitting control transistor T1 is not turned on, so that the drain of the drive transistor is suspended. In such a manner, the hole carriers are trapped at the gate oxide layer of the drive transistor under the F-N tunneling effect, thereby increasing the absolute value of the threshold voltage of the drive transistor.

In the threshold compensation phase, the first voltage signal V1 is provided to the gate of the drive transistor, the second voltage signal V2 is provided to the source and the substrate of the drive transistor, and the potential of the first voltage signal V1 is greater than the potential of the second voltage signal V2, so that the potential of the gate of the drive transistor is greater than the potential of the substrate of the driver DTFT. The light emitting control transistor T1 is thus not turned on, and the drain of the drive transistor is suspended. In such a manner, the hole carriers trapped in the gate oxide layer of the drive transistor are removed under the F-N tunneling effect, thereby reducing the absolute value of the threshold voltage of the drive transistor.

Figure 7:
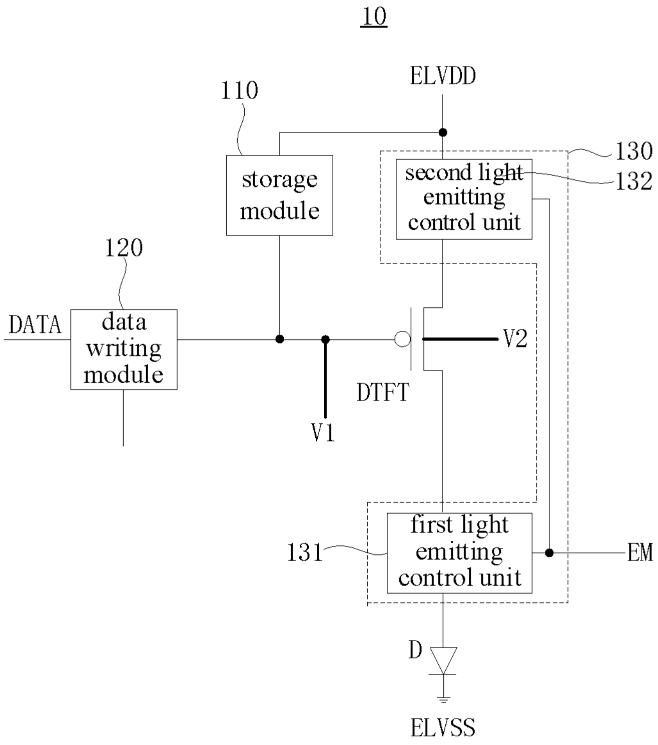
FIG. 7 is a schematic structure diagram of a pixel circuit according to an embodiment.

In an embodiment as shown in FIG. 7, the light emitting control module 130 may include a first light emitting control unit 131 and a second light emitting control unit 132. A first terminal of the first light emitting control unit 131 is connected to the second electrode of the drive transistor, and a second terminal of the first light emitting control unit 131 is configured to be connected to the light-emitting element. A first terminal of the second light emitting control unit 132 is configured to receive the first power supply voltage signal ELVDD, a second terminal of the second light emitting control unit 132 is connected to the first electrode of the drive transistor, and a control terminal of the first light emitting control unit 131 and a control terminal of the second light emitting control unit 132 are respectively configured to receive the light emitting control signal EM.

Figure 8:
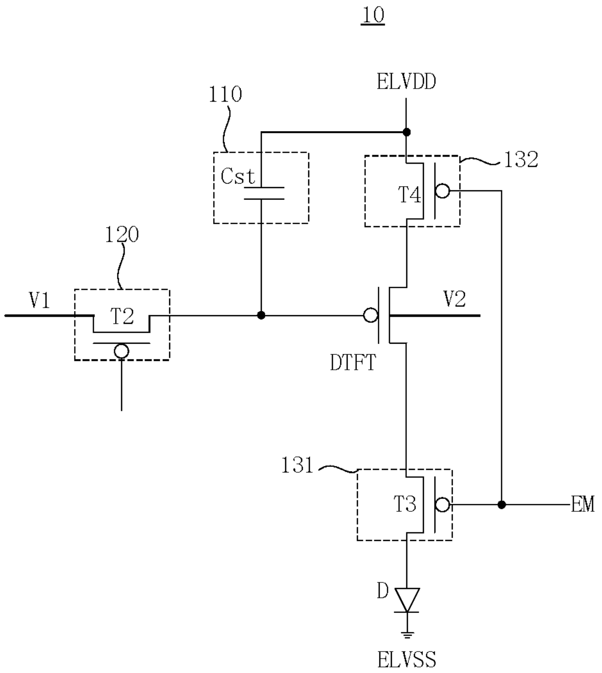
FIG. 8 is a schematic structure diagram of a pixel circuit according to an embodiment.

In an embodiment as shown in FIG. 8, the first light emitting control unit 131 may include a first light emitting control transistor T3. A first electrode of the first light emitting control transistor T3 is connected to the second electrode of the drive transistor, and a second electrode of the first light emitting control transistor T3 is configured to be connected to the light-emitting element. The second light emitting control unit 132 may include a second light emitting control transistor T4. A first electrode of the second light emitting control transistor T4 is configured to receive the first power supply voltage signal ELVDD, a second electrode of the second light emitting control transistor T4 is connected to the first electrode of the drive transistor, a control electrode of the first light emitting control transistor T3 and a control electrode of the second light emitting control transistor T4 are respectively configured to receive the light emitting control signal EM.

The pixel circuit shown in FIG. 8 is a 4T1C pixel circuit according to an embodiment of the present disclosure. Referring to FIG. 8, the regulating process of the threshold voltage of the drive transistor in the pixel circuit in the embodiment is illustrated by using the F-N tunneling principle and the P-type drive transistor as an example. The control electrode of the drive transistor is the gate of the drive transistor, the first electrode of the drive transistor is the source of the drive transistor, and the second electrode of the drive transistor is the drain of the drive transistor.

In the threshold compensation phase, the first voltage signal V1 is provided to the gate of the drive transistor, the second voltage signal V2 is provided to the substrate of the drive transistor, and the potential of the first voltage signal V1 is less than the potential of the second voltage signal V2, so that the potential of the gate of the drive transistor is less than the potential of the substrate of the drive transistor, and neither the first light emitting control transistor T3 nor the second light emitting transistor T4 is turned on, accordingly both the source and drain of the drive transistor are suspended. In such a manner, the hole carriers are trapped in the gate oxide layer of the drive transistor under the F-N tunneling effect, thereby increasing the absolute value of the threshold voltage of the drive transistor.

In the threshold compensation phase, the first voltage signal V1 is provided to the gate of the drive transistor, the second voltage signal V2 is provided to the substrate of the drive transistor, and the potential of the first voltage signal V1 is greater than the potential of the second voltage signal V2, so that the potential of the gate of the drive transistor is greater than the potential of the substrate of the drive transistor, and neither the first light emitting control transistor T3 nor the second light emitting transistor T4 is turned on, accordingly both the source and the drain of the drive transistor are suspended. In such a manner, the hole carriers trapped in the gate oxide layer of the drive transistor are removed under the F-N tunneling effect, thereby reducing the absolute value of the threshold voltage of the drive transistor.

In the embodiment of the present disclosure, two novel pixel circuit structures are provided, e.g., the 3T1C pixel circuit structure and the 4T1C pixel circuit structure, each of which includes a light emitting control module. Based on the arrangement of the light emitting control module, the first voltage signal V1 and the second voltage signal V2 are respectively provided on the control electrode and the substrate of the drive transistor in the threshold compensation phase. The first voltage signal V1 is different from the second voltage signal V2. Accordingly, the threshold voltage of the drive transistor can be regulated under the combined effect of the first voltage signal V1 and the second voltage signal V2, so that the threshold voltage of the drive transistor in each pixel circuit in the display panel can be consistent, and further, the brightness of each light-emitting element in the display panel can be consistent with the target brightness, that is, the brightness of each light-emitting element in the display panel is consistent. Accordingly, in the embodiment, the problem of non-uniform brightness of each light-emitting element in the display panel is addressed. The pixel circuit provided in the embodiment has a simple structure and low cost.

At present, due to the deviations in the actual manufacturing process, the threshold voltage Vth of the drive transistor in each pixel circuit of the OLED display panel is not completely consistent, so that the brightness uniformity problem exists in each OLED light-emitting element, and the brightness is non-uniform on the screen of the display panel.

Figure 9:
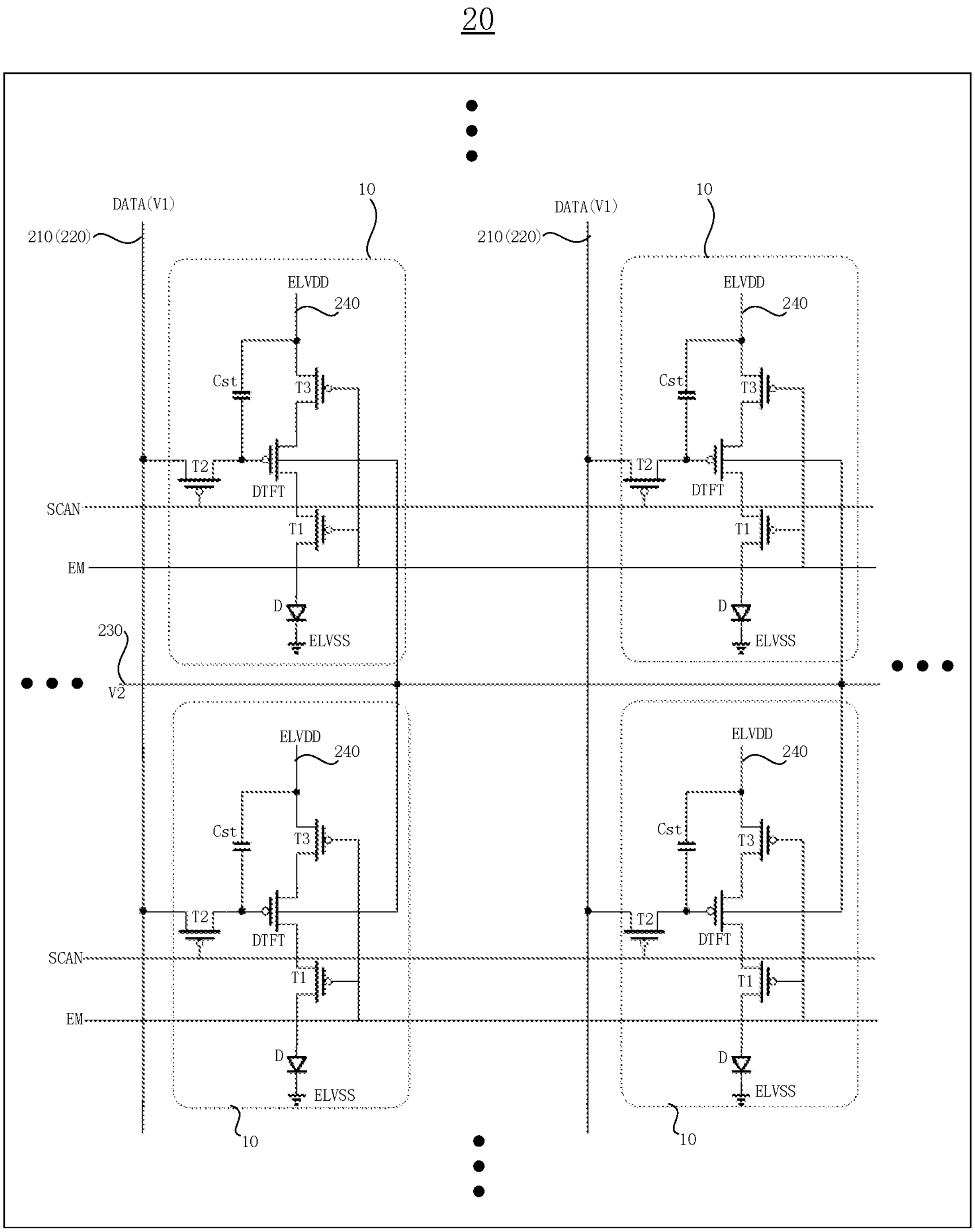
FIG. 9 is a schematic structure diagram of a display panel according to an embodiment.

In view of this, based on the same inventive concept, in an embodiment of the present disclosure, a display panel is further provided. The display panel may be an OLED display panel. In an embodiment as shown in FIG. 9, the display panel 20 may include at least one pixel circuit 10 provided in any one of the aforementioned embodiments, and at least one light-emitting element D connected to the corresponding pixel circuit 10. The light-emitting element D may be an OLED light-emitting element, and the display panel 20 may further include a display driver circuit (not shown in FIG. 9). The display driver circuit is connected to the pixel circuit, and is configured to acquire brightness information of the light-emitting element connected to the pixel circuit, and provide a first voltage signal V1 and a second voltage signal V2 to the pixel circuit in the threshold compensation phase according to the brightness information, to change the threshold voltage of the drive transistor in the pixel circuit, so that the brightness information is consistent with the target brightness.

In a case where the OLED display panel includes a plurality of OLED light-emitting elements arranged in an array and a plurality of corresponding pixel circuits, the threshold voltage of the drive transistor in each pixel circuit is regulated by using the pixel circuit in the embodiment of the present disclosure according to the first voltage signal V1 and the second voltage signal V2, so that the threshold voltage of the drive transistor in each pixel circuit of the display panel is consistent, and the brightness of each light-emitting element in the display panel is consistent with the target brightness, that is, the brightness of each light-emitting element in the display panel is consistent. Therefore, through the embodiments of the present disclosure, the brightness uniformity of each light-emitting element in the display panel is improved, so that the display brightness of the screen of the display panel is even, and a good display effect is achieved.

In an embodiment, referring to FIG. 9, the display panel may further include a data signal line 210, a first signal transmission line 220, and a second signal transmission line 230. The display driver circuit is connected to the data signal line 210, the first signal transmission line 220, and the second signal transmission line 230 respectively, and is configured to provide a data signal DATA in the data writing phase to transmit the data signal DATA to the data writing module 120 through the data signal line 210, and provide the first voltage signal V1 and the second voltage signal V2 in the threshold compensation phase. The first voltage signal V1 is transmitted to the control electrode of the drive transistor through the first signal transmission line 220, and the second voltage signal V2 is transmitted to the substrate of the drive transistor through the second signal transmission line 230. That is, the data signal DATA provided by the display driver circuit is transmitted to the data writing module 120 through the data signal line 210, the first voltage signal V1 provided by the display driver circuit is transmitted to the control electrode of the drive transistor through the first signal transmission line 220, and the second voltage signal V2 provided by the display driver circuit is transmitted to the substrate of the drive transistor through the second signal transmission line 230.

Further, in the display panel of the embodiment of the present disclosure, each pixel circuit may be respectively connected to one first signal transmission line 220, or a plurality of pixel circuits may be jointly connected to one first signal transmission line 220. Alternatively, each pixel circuit may be respectively connected to one second signal transmission line 230, or a plurality of pixel circuits may be jointly connected to one second signal transmission line 230.

In an embodiment, referring to FIG. 9, the data signal line 210 and the first signal transmission line 220 are the same signal transmission line. That is, the data signal line 210 may be multiplexed to the first signal transmission line 220, in order to reduce the number of wires in the display panel, simplify the structure of the display panel, and reduce the cost of the display panel.

In an embodiment, referring to FIG. 9, the display panel may further include a power supply signal line 240, and the display driver circuit may further include a display driver unit (not shown in FIG. 9) and a power supply unit (not shown in FIG. 9). The display driver unit is configured to provide the data signal DATA in the data writing phase, and provide the first voltage signal V1 in the threshold compensation phase. The power supply unit is connected to the display driver unit, and is configured to provide and transmit the first power supply voltage signal ELVDD to the pixel circuit through the power supply signal line 240, and provide the second voltage signal V2 in the threshold compensation phase. In other words, the first power supply voltage signal ELVDD provided by the power supply unit is transmitted to the pixel circuit through the power supply signal line 240, and the power supply unit is further configured to provide the second voltage signal V2 in the threshold compensation phase.

Figure 10:
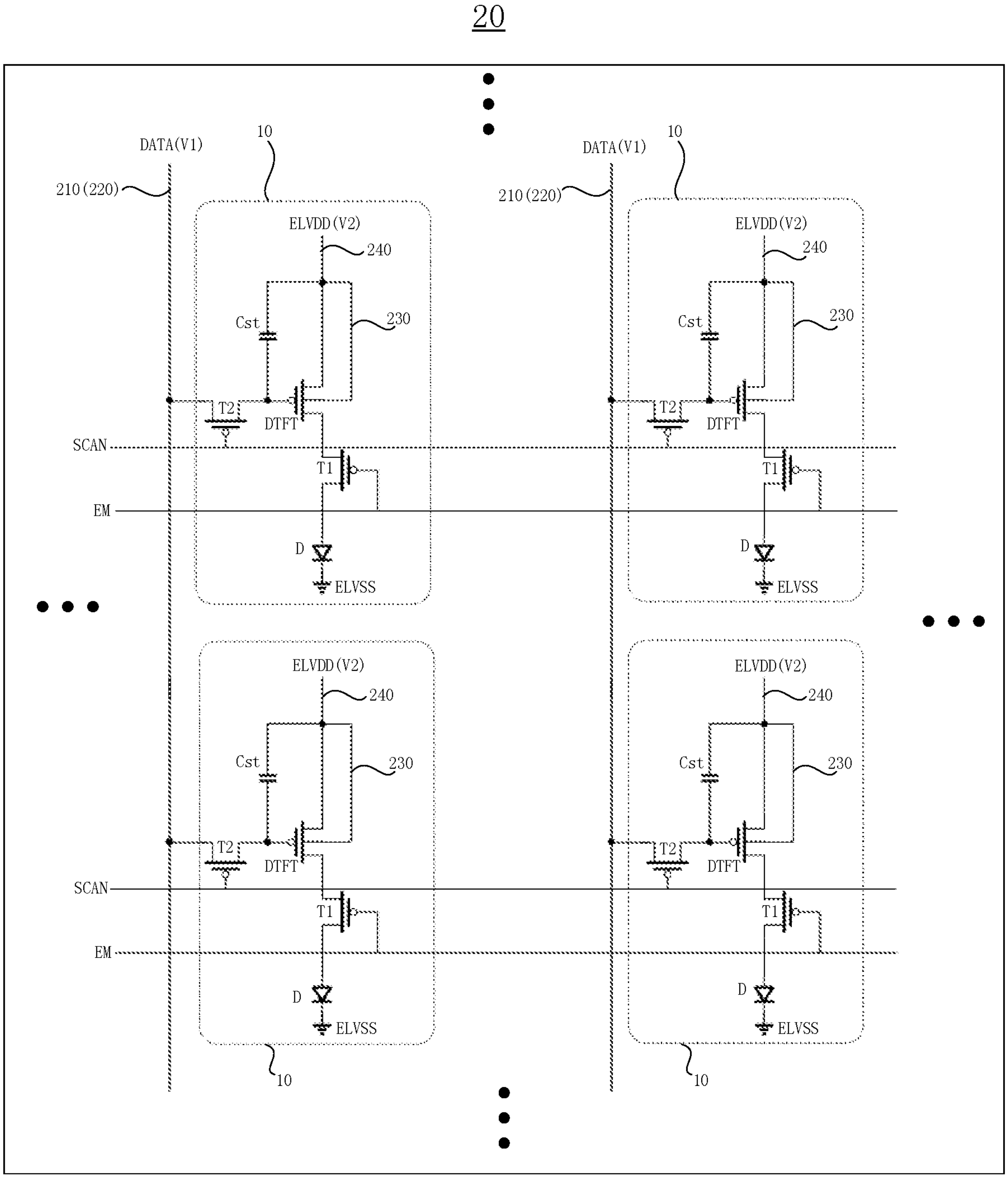
FIG. 10 is a schematic structure diagram of a display panel according to an embodiment.

In an embodiment, referring to FIG. 10, in the pixel circuit, a first terminal of the light emitting control module 130 is configured to be connected to the second electrode of the drive transistor, a second terminal of the light emitting control module 130 is configured to be connected to the light-emitting element, a control terminal of the light emitting control module 130 is configured to receive the light emitting control signal EM, and the power supply signal line 240 is connected to the second signal transmission line 230. That is, the power supply signal line 240 can be connected to the second signal transmission line 230, thereby the wiring of the display panel is simplified, so that the structure of the display panel is simple.

Figure 11:
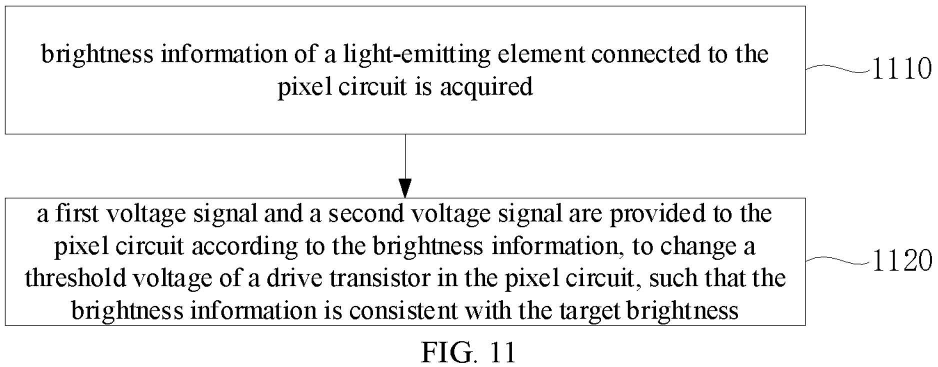
FIG. 11 is a flow chart of a brightness compensation method for a display panel according to an embodiment.

Based on the same inventive concept, in an embodiment of the present disclosure, a brightness compensation method for a display panel is provided, which may be applied to compensate the brightness of the display panel in any one of the aforementioned embodiments. Referring to FIG. 11, in the threshold compensation phase of the pixel circuit, the brightness compensation method for the display panel may include the following steps 1110 to 1120. In step 1110, brightness information of a light-emitting element connected to the pixel circuit is acquired. At step 1120, a first voltage signal and a second voltage signal are provided to the pixel circuit according to the brightness information, to change a threshold voltage of a drive transistor in the pixel circuit, such that the brightness information is consistent with the target brightness.

According to the brightness compensation method provided in the embodiment of the present disclosure, in the threshold compensation phase of the pixel circuit, the brightness information of the light-emitting element connected to the pixel circuit is acquired, and the first voltage signal and the second voltage signal different from the first voltage signal are provided to the pixel circuit according to the brightness information. Consequently, the threshold voltage of the drive transistor can be regulated under the combined effect of the first voltage signal and the second voltage signal. Accordingly, the threshold voltage of the drive transistor in each pixel circuit of the display panel can be consistent, and brightness of each light-emitting element in the display panel is consistent with the target brightness, i.e., the brightness of the light-emitting elements in the display panel is uniform. Therefore, by the solution of the embodiment of the present disclosure, the brightness uniformity of each light-emitting element in the display panel is improved, and the brightness compensation method for the display panel provided in the embodiment of the present disclosure is easy to implement.

In an embodiment, the step 1120 may include:

The brightness information is compared to the target brightness;

When a comparison result indicates that the brightness information is greater than the target brightness, the first voltage signal with a first potential and the second voltage signal with a second potential are provided, in which the first potential is less than the second potential, in order to increase the absolute value of the threshold voltage of the drive transistor in the pixel circuit, so that the brightness information is consistent with the target brightness;

When the comparison result indicates that the brightness information is less than the target brightness, the first voltage signal with the first potential and the second voltage signal with the second potential are provided, in which the first potential is greater than the second potential, in order to reduce the absolute value of the threshold voltage of the drive transistor in the pixel circuit, so that the brightness information is consistent with the target brightness; and When the comparison result indicates that the brightness information is equal to the target brightness, there is no need to provide the first voltage signal and the second voltage signal to the pixel circuit, so that the threshold voltage of the drive transistor in the pixel circuit remains unchanged, and the brightness information is consistent with the target brightness.

In an embodiment, the display panel may include a display area, the display area is partitioned into a plurality of sub-display areas, and each sub-display area may include a plurality of light-emitting elements and a plurality of corresponding pixel circuits connected to the plurality of light-emitting elements. The brightness compensation method for the display panel may further include:

Brightness information of a sub-display area is acquired, and the brightness information of the sub-display area may be an average value of brightness information of all light-emitting elements in the sub-display area; and The same first voltage signal and the same second voltage signal are provided to each pixel circuit in the sub-display area according to the brightness information of the sub-display area, to change a threshold voltage of a drive transistor in each pixel circuit in the sub-display area, so that the brightness information of the sub-display area is consistent with the target brightness.

In an embodiment, the step of providing the same first voltage signal and the same second voltage signal to each pixel circuit in the sub-display area according to the brightness information of the sub-display area to change the threshold voltage of the drive transistor in each pixel circuit in the sub-display area may further include:

The brightness information of the sub-display area is compared to the target brightness;

When the comparison result indicates that the brightness information is greater than the target brightness, the first voltage signal with a first potential and the second voltage signal with a second potential are provided to each pixel circuit in the sub-display area, in which the first potential is less than the second potential, in order to increase the absolute value of the threshold voltage of the drive transistor in each pixel circuit in the sub-display area, so that the brightness information of the sub-display area is consistent with the target brightness;

When the comparison result indicates that the brightness information is less than the target brightness, the potential of the first voltage signal provided to each pixel circuit in the sub-display area is greater than the potential of the second voltage signal provided, in order to reduce the absolute value of the threshold voltage of the drive transistor in each pixel circuit in the sub-display area, so that the brightness information of the sub-display area is consistent with the target brightness; and When the comparison result indicates that the brightness information is equal to the target brightness, there is no need to provide the first voltage signal and the second voltage signal to each pixel circuit in the sub-display area, so that the threshold voltage of the drive transistor of each pixel circuit in the sub-display area remains unchanged, and the brightness information of the sub-display area is consistent with the target brightness.

In an embodiment, the brightness compensation method for the display panel may further include: the threshold voltage compensation is performed on the drive transistors in each sub-display area sequentially, in order to complete the compensation for the threshold voltage of each drive transistor in the entire display area of the display panel.

According to the brightness compensation method for the display panel provided in the embodiment of the present disclosure, the brightness of all sub-display areas can be compensated to implement the brightness compensation for the entire display area of the display panel.

According to the brightness compensation method for the display panel provided in the embodiment of the present disclosure, in the threshold compensation phase of the pixel circuit, the brightness information of the sub-display area is acquired, the brightness information of the sub-display area is compared to the target brightness, and the first voltage signal and the second voltage signal are provided to each pixel circuit in the sub-display area according to the comparison result. The first voltage signal is different from the second voltage signal, so that the threshold voltage of the drive transistor can be regulated under the combined effect of the first voltage signal and the second voltage signal, and accordingly, the threshold voltage of the drive transistor in each pixel circuit in the display panel can be consistent.

Further, the brightness of each light-emitting element in the display panel is consistent with the target brightness, that is, the brightness of each light-emitting element in the display panel is uniform. By the technical solution of the embodiment of the present disclosure, the brightness uniformity of each light-emitting element in the display panel is improved. The brightness compensation method for the display panel provided in the embodiment of the present disclosure is simple and easy to implement.

The technical limitations in the above embodiments can be combined arbitrarily. In order to make the description concise, all possible combinations of the technical limitations in the above embodiments are not described. However, as long as there is no contradiction in the combination of these technical limitations, theses combinations are considered to fall within the scope of the present disclosure.

The above-mentioned embodiments are merely some exemplary embodiments of the present disclosure, and the descriptions thereof are relatively specific and detailed, but should not be construed as a limitation on the scope of the present disclosure. It should be pointed out that those skilled in the art can make several transformations and improvements without departing from the concept of the present disclosure, which all fall within the protection scope of the present disclosure. Therefore, the scope of protection of the present disclosure is subject to the appended claims.

What is claimed is:

1. A pixel circuit, comprising a drive transistor, a data writing module, a storage module, and a light emitting control module, wherein a first terminal of the storage module is configured to receive a first power supply voltage signal, and a second terminal of the storage module is configured to be connected to a control electrode of the drive transistor;

a first terminal of the data writing module is configured to receive a data signal, a second terminal of the data writing module is configured to be connected to the control electrode of the drive transistor, and the data writing module is configured to write the data signal into the storage module in a data writing phase;

the control electrode of the drive transistor is further configured to receive a first voltage signal, a substrate of the drive transistor is configured to receive a second voltage signal, a first electrode of the drive transistor is configured to receive the first power supply voltage signal, a second electrode of the drive transistor is configured to be connected to the light emitting control module, and the first voltage signal is different from the second voltage signal;

a control terminal of the light emitting control module is configured to receive a light emitting control signal, and an output terminal of the light emitting control module is configured to be connected to a light-emitting element; and a threshold voltage of the drive transistor is regulated under a combined effect of the first voltage signal and the second voltage signal in a threshold compensation phase, and a time sequence of the threshold compensation phase is different from a time sequence of the data writing phase.

2. The pixel circuit according to claim 1, wherein when a potential of the first voltage signal is greater than a potential of the second voltage signal, an absolute value of the threshold voltage of the drive transistor is reduced to be less than a reference threshold voltage under the combined effect of the first voltage signal and the second voltage signal in the threshold compensation phase.

3. The pixel circuit according to claim 1, wherein when a potential of the first voltage signal is less than a potential of the second voltage signal, an absolute value of the threshold voltage of the drive transistor is increased to be greater than a reference threshold voltage under the combined effect of the first voltage signal and the second voltage signal in the threshold compensation phase.

4. The pixel circuit according to claim 3, the second voltage signal is the first power supply voltage signal.

5. The pixel circuit according to claim 1, wherein a signal transmission line configured to provide a data signal in the pixel circuit is multiplexed to provide the first voltage signal.

6. The pixel circuit according to claim 1, wherein the light emitting control module is connected between the second electrode of the drive transistor and the light-emitting element, the control terminal of the light emitting control module is configured to receive the light emitting control signal, the first electrode of the drive transistor and the substrate of the drive transistor are both configured to receive the first power supply voltage signal, the threshold voltage of the drive transistor is changed under a combined effect of the first voltage signal and the first power supply voltage signal in the threshold compensation phase.

7. The pixel circuit according to claim 6, wherein the light emitting control module comprises a light emitting control transistor, a first electrode of the light emitting control transistor is configured to be connected to the second electrode of the drive transistor, a second electrode of the light emitting control transistor is configured to be connected to the light-emitting element, and a control electrode of the light emitting control transistor is configured to receive the light emitting control signal.

8. The pixel circuit according to claim 1, wherein the light emitting control module comprises a first light emitting control unit and a second light emitting control unit, a first terminal of the first light emitting control unit is configured to be connected to the second electrode of the drive transistor, a second terminal of the first light emitting control unit is configured to be connected to the light-emitting element, a first terminal of the second light emitting control unit is configured to receive the first power supply voltage signal, a second terminal of the second light emitting control unit is configured to be connected to the first electrode of the drive transistor, and a control terminal of the first light emitting control unit and a control terminal of the second light emitting control unit are respectively configured to receive the light emitting control signal.

9. The pixel circuit according to claim 8, wherein the first light emitting control unit comprises a first light emitting control transistor, a first electrode of the first light emitting control transistor is configured to be connected to the second electrode of the drive transistor, a second electrode of the first light emitting control transistor is configured to be connected to the light-emitting element, the second light emitting control unit comprises a second light emitting control transistor, a first electrode of the second light emitting control transistor is configured to receive the first power supply voltage signal, a second electrode of the second light emitting control transistor is configured to be connected to the first electrode of the drive transistor, a control electrode of the first light emitting control transistor and a control electrode of the second light emitting control transistor are respectively configured to receive the light emitting control signal.

10. The pixel circuit according to claim 1, wherein the drive transistor is a floating gate transistor.

11. A display panel, comprising at least one pixel circuit according to claim 1, and a display driver circuit connected to the at least one pixel circuit, wherein the display driver circuit is configured to acquire brightness information of the light-emitting element connected to the at least one pixel circuit, and provide the first voltage signal and the second voltage signal to the at least one pixel circuit in the threshold compensation phase according to the brightness information, to change the threshold voltage of the drive transistor in the at least one pixel circuit and allow the brightness information to be consistent with target brightness.

12. The display panel according to claim 11, wherein the display panel further comprises a data signal line, a first signal transmission line, and a second signal transmission line, and wherein the display driver circuit is configured to be connected to the data signal line, the first signal transmission line, and the second signal transmission line respectively, and is configured to:

provide the data signal in the data writing phase to transmit the data signal to the data writing module through the data signal line; and provide the first voltage signal and the second voltage signal in the threshold compensation phase, the first voltage signal being transmitted to the control electrode of the drive transistor through the first signal transmission line, and the second voltage signal being transmitted to the substrate of the drive transistor through the second signal transmission line.

13. The display panel according to claim 12, wherein the data signal line and the first signal transmission line are the same signal transmission line.

14. The display panel according to claim 12, wherein the display panel further comprises a power supply signal line, the display driver circuit further comprises a display driver unit and a power supply unit, the display driver unit is configured to provide the data signal in the data writing phase and provide the first voltage signal in the threshold compensation phase, the power supply unit is connected to the display driver unit and is configured to provide and transmit the first power supply voltage signal to the at least one pixel circuit through the power supply signal line, and provide the second voltage signal in the threshold compensation phase.

15. The display panel according to claim 14, wherein a first terminal of the light emitting control module is configured to be connected to the second electrode of the drive transistor, the output terminal of the light emitting control module is configured to be connected to the light-emitting element, the control terminal of the light emitting control module is configured to receive the light emitting control signal, and the power supply signal line is connected to the second signal transmission line.

16. A brightness compensation method for the display panel of claim 11, comprising, in the threshold compensation phase of the at least one pixel circuit, acquiring the brightness information of the light-emitting element connected to the at least one pixel circuit, and providing the first voltage signal and the second voltage signal to the at least one pixel circuit according to the brightness information, to change the threshold voltage of the drive transistor in the at least one pixel circuit and allow the brightness information to be consistent with the target brightness.

17. The brightness compensation method for the display panel according to claim 16, wherein the providing the first voltage signal and the second voltage signal to the at least one pixel circuit according to the brightness information to change the threshold voltage of the drive transistor in the at least one pixel circuit comprises:

comparing the brightness information to the target brightness;

when a comparison result indicates that the brightness information is greater than the target brightness, providing the first voltage signal with a first potential and the second voltage signal with a second potential to increase an absolute value of the threshold voltage of the drive transistor in the at least one pixel circuit, wherein the first potential is less than the second potential; and when the comparison result indicates that the brightness information is less than the target brightness, providing the first voltage signal with the first potential and the second voltage signal with the second potential to reduce the absolute value of the threshold voltage of the drive transistor in the at least one pixel circuit, wherein the first potential is greater than the second potential.

* * * * *